United States Patent [19]

Schepp

[11] Patent Number: 5,467,647
[45] Date of Patent: Nov. 21, 1995

[54] CLAMP ASSEMBLY FOR TESTING AND/OR MEASURING UNIT ACTIVATED UPON INFLATION OF A PNEUMATIC TIRE

[75] Inventor: Michael Schepp, Darmstadt, Germany

[73] Assignee: Hofmann Maschinenbau GmbH, Germany

[21] Appl. No.: 249,032

[22] Filed: May 25, 1994

[30] Foreign Application Priority Data

May 28, 1993 [DE] Germany .................. 43 17 970.3

[51] Int. Cl.⁶ ......................................... G01M 17/02
[52] U.S. Cl. .................................. 73/146; 403/31
[58] Field of Search .................... 73/146, 146.2, 73/146.3, 146.4, 146.5, 146.8, 78, 862.381; 403/5, 31

[56] References Cited

U.S. PATENT DOCUMENTS

| | | | |
|---|---|---|---|
| 3,969,933 | 7/1976 | Himmler | 73/146 |
| 4,023,407 | 5/1977 | Vanderzee | 73/146 |
| 4,964,299 | 10/1990 | Maier et al. | 73/146 |
| 4,971,128 | 11/1990 | Koga et al. | 73/146 |

FOREIGN PATENT DOCUMENTS 62-148832  7/1987  Japan ................... 73/146
566171     3/1993  Japan ................... 73/146

OTHER PUBLICATIONS

Hofmann Report 89, Automatische Reifengleichformigkeits–Messanlage fur PKW–und LLKW–Reifen Typ RGM–E.

*Primary Examiner*—Richard Chilcot
*Assistant Examiner*—Joseph L. Felber
*Attorney, Agent, or Firm*—Cushman Darby & Cushman

[57] ABSTRACT

An apparatus for mounting a pneumatic tire in a testing and/or measuring apparatus comprises first and second mounting rim portions for holding a pneumatic tire between them in an inflated condition, on a rotatable spindle. The mounting rim portions are carried in concentric relationship with respect to the axis of rotation of the spindle, the first mounting rim portion being slidable in the axial direction on a guide. A clamp non-rotatably clamps the first rim portion to the guide along which the rim portion is displaceable in a released condition. The clamp includes a clamping element which is disposed about the axis and which is deformable upon inflation of the tire by the tire-inflation pressure to form a positively locking engagement between the first rim portion and the guide.

16 Claims, 3 Drawing Sheets

CLAMP ASSEMBLY FOR TESTING AND/OR MEASURING UNIT ACTIVATED UPON INFLATION OF A PNEUMATIC TIRE

BACKGROUND OF THE INVENTION

There are various tire measuring and/or tire testing operations that require the tire to be mounted in an inflated condition in order to carry out measuring and/or testing steps thereon. To permit such an operation to be performed, use may be made of an apparatus for mounting a pneumatic tire in a measuring and/or testing unit, the apparatus including first and second mounting rim portions which hold between them a pneumatic tire in an inflated condition. The apparatus has a guide for rotationally mounting the rim portions in concentric relationship with respect to an axis, together with a clamping device for non-rotatably clamping one of the rim portions to the guide along which that rim portion is displaceable in the released condition thereof. Such a tire mounting apparatus is used for example in measuring units for checking the uniformity of motor vehicle tires (in this respect reference may be directed to the company publication Holmann Report 89, imprint 09.84). The displaceable rim portion is guided slidably on the guide in the direction of the axis of rotation about which the tire is rotated, for example, for the purpose of setting different tire widths as measured at the radially inward circumference of the tire, that is to say at the tire beads. To produce such displacement of the displaceable rim portion, it is necessary to allow a certain guide play or clearance between the guide and the rim portion or a carrier on which the rim portion is fixed.

SUMMARY OF THE INVENTION

An object of the present invention is to provide an apparatus for mounting a pneumatic tire in a measuring unit and/or testing unit so that the tire is centered in relation to the axis about which it is rotated.

Another object of the present invention is to provide an apparatus for mounting a pneumatic tire in an inflated condition for a measuring and/or testing operation to be carried thereon, which is designed to mount the tire in such a way as will substantially eliminate run-out errors in the mounting structure.

Still another object of the present invention is to provide an apparatus for mounting a pneumatic tire in an inflated condition for measuring and/or testing thereof, which is so designed as to permit the tire to be readily fitted to the apparatus and then securely held in the correct position therein.

A still further object of the present invention is to provide an apparatus for mounting a pneumatic tire for measuring and/or testing same, including first and second mounting rim portions for holding the tire therebetween, the apparatus being so designed as to provide for satisfactory centering of a rim portion which is movable for fitting the tire to the apparatus, such centering occurring when the rim portions are braced in the position for holding the pneumatic tire fast therebetween.

In accordance with the principles of the present invention the foregoing and other objects are achieved by an apparatus for mounting a pneumatic tire in a unit for measuring and/or testing same, including first and second mounting rim halves or portions, between which the pneumatic tire is held in an inflated condition in a testing or measuring operation. A guide rotationally mounts the rim portions in central or concentric relationship with respect to an axis, while a clamping means is adapted to non-rotatably clamp a rim portion to the guide, along which that rim portion is displaceable in the released condition thereof. The clamping means includes a clamping element which is disposed around the above-mentioned axis and which is deformable upon inflating of the tire by the inflation pressure to form a positively locking engagement between the same rim portion and the guide means on which it is displaceable.

As will be seen in greater detail hereinafter in connection with a preferred embodiment of the apparatus according to the invention, a play or clearance which is provided between the guide and the rim portion which is movable thereon, or a carrier member carrying that rim portion, which play or clearance is provided to permit easy sliding movement of the rim portion or its carrier member on the guide for fitting a pneumatic tire into position in the apparatus, can be removed utilizing the inflation pressure with which the tire when fitted is inflated for carrying out the measuring or testing operation thereon. For that purpose, the apparatus uses a clamping element which is deformable by the tire-inflation pressure.

In accordance with a preferred feature of the apparatus of the invention the clamping element is adapted to be elastically deformable so that when the inflation pressure is removed or cut off again, the clamping element returns to its initial or original condition again, thereby disengaging the engagement between the rim portion and the guide. The rim portion of the carrier member on which the rim portion is mounted is then freely movable again with guide play, relative to the guide on which it is carried.

In accordance with another preferred feature of the invention, at least one pressure transmission element may be provided for transmission of the tire-inflation pressure between the interior of the tire and the clamping element. By virtue of the movement of the pressure transmission element, which is caused by the tire-inflation pressure, the pressure transmission element can correspondingly deform the clamping element to produce the engagement between the rim portion and the guide means. For that purpose, the pressure transmission element and the clamping element may have conical or taper surfaces with which they bear against each other and by way of which the movement produced by the tire-inflation pressure is transmitted for deformation of the clamping element.

Preferably, the movement of the clamping element with which the deformation force is caused to act on the clamping element is in an axial direction.

In a preferred feature, the pressure transmission element may be in the form of a pressure ring and the pressure ring may also constitute the carrier for the mounting rim portion which is displaceable in the released condition of the apparatus.

In another preferred feature, the clamping element may be in the form of a ring which is spreadable in a radial direction. The radial elastic deformability, such as to produce spreading of the ring, may be afforded, for example, by at least one suitably disposed slit in the clamping element.

Further objects, features and advantages of the invention will be apparent from the following description of the invention.

DESCRIPTION OF THE PREFERRED EMBODIMENT

Figure 1:
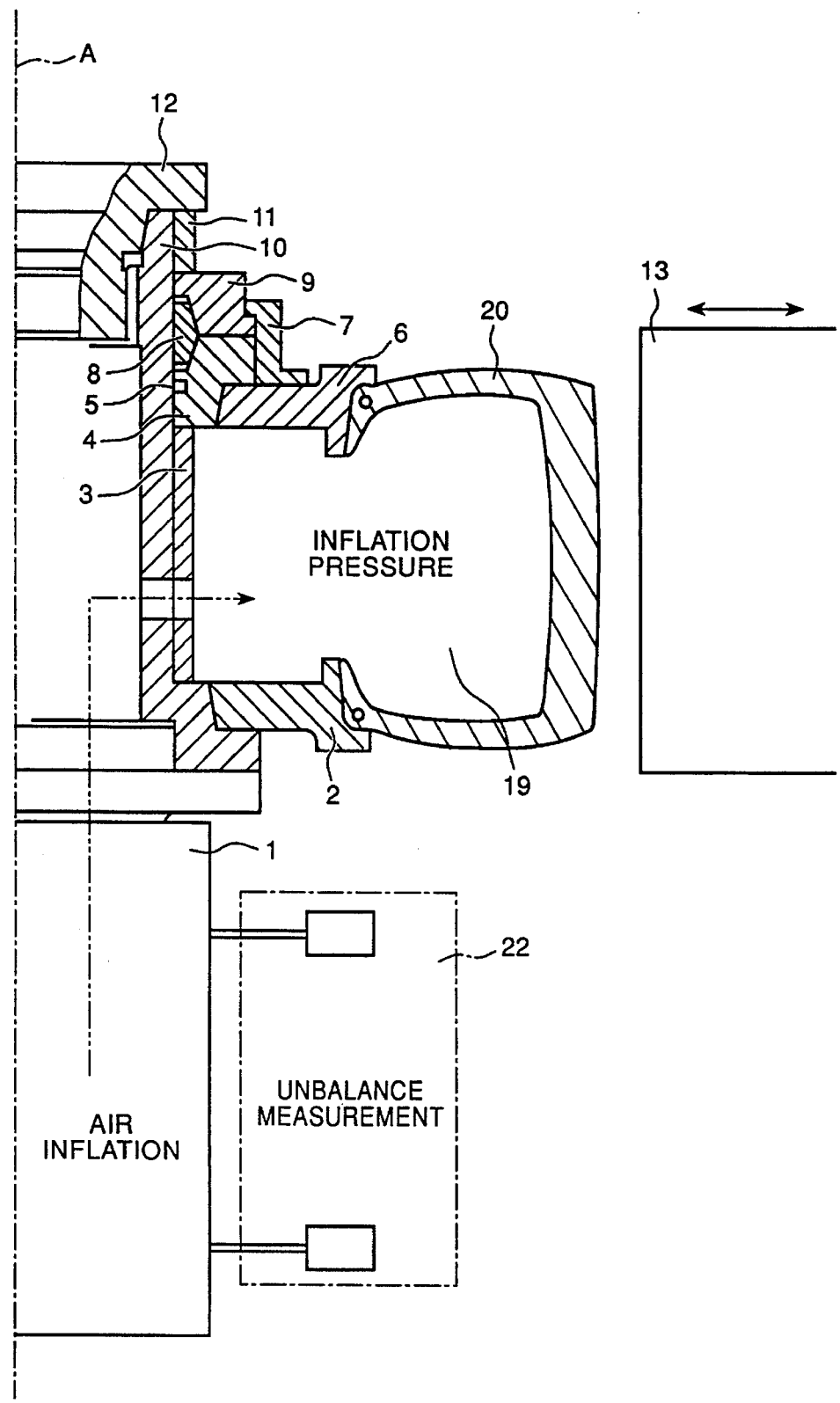
FIG. 1 is a diagrammatic view, partially in section, of an embodiment of a tire mounting apparatus according to the invention.

Referring firstly to FIG. 1, reference numeral 1 therein denotes a spindle of a tire measuring and/or testing machine in which a test in respect of uniformity of a pneumatic tire or measurements in respect of irregularities of a tire can be carried out. The appropriate measurement or testing operation can be performed by means of a pressure wheel 13 which can be moved towards and suitably pressed against a pneumatic tire 20 to be measured or tested, when in a suitably inflated condition.

It will further be noted at this point that unbalance measurement can also be carried out by coupling an unbalance measuring device to the spindle 1 by way of suitable force pick-ups or sensors, as is indicated by a diagrammatically illustrated unbalance measuring device identified by reference numeral 22 in FIG. 1.

Disposed at the upper end of the spindle which is in the form of a precision spindle is a tire mounting apparatus. The tire mounting apparatus comprises first and second mounting rim portions, more specifically a lower mounting rim portion 2 and an upper mounting rim portion 6. The lower rim portion 2 is fixedly connected to a guide 10 which in the illustrated embodiment is of a cylindrical configuration and is non-rotatably connected to the spindle 1 by a suitable flange mounting. It will be seen from FIG. 1 that the pneumatic tire 20 is suitably held between the two mounting rim portions 2 and 6, in an inflated condition, and the two rim portions 2 and 6 are mounted in concentric relationship with respect to an axis A about which the tire mounting apparatus and therewith the inflated pneumatic tire 20 are to be rotated in a measuring or testing operation.

The upper rim portion 6 is mounted on the guide 10 in such a way as to be displaceable along guide 10 in the axial direction thereof, that is to say, in the direction of the axis of rotation A, when the upper rim portion 6 is in a released condition. In that way it is possible for the distance between the two rim portions 2 and 6 to be adjusted to different widths of the pneumatic tire 20, as measured more specifically at the radially inward circumference thereof, at the tire beads. A spacer sleeve 3 may be disposed on the guide 10 for adjusting a given tire width, the spacer sleeve 3 extending between the two rim portions 2 and 6 parallel to the axis A.

The upper rim portion 6 or an associated carrier means for same, which is shown in greater detail in FIG. 2 together with a clamping arrangement, can be displaced relative to the guide 10 in the axial direction, by virtue of guide play or clearance as indicated at 18 and 21 in FIG. 2, to which further reference will be made below. A non-rotatable connection as between the upper rim portion 6 and the guide 10 can then be made by means of the above-mentioned clamping arrangement.

Figure 2:
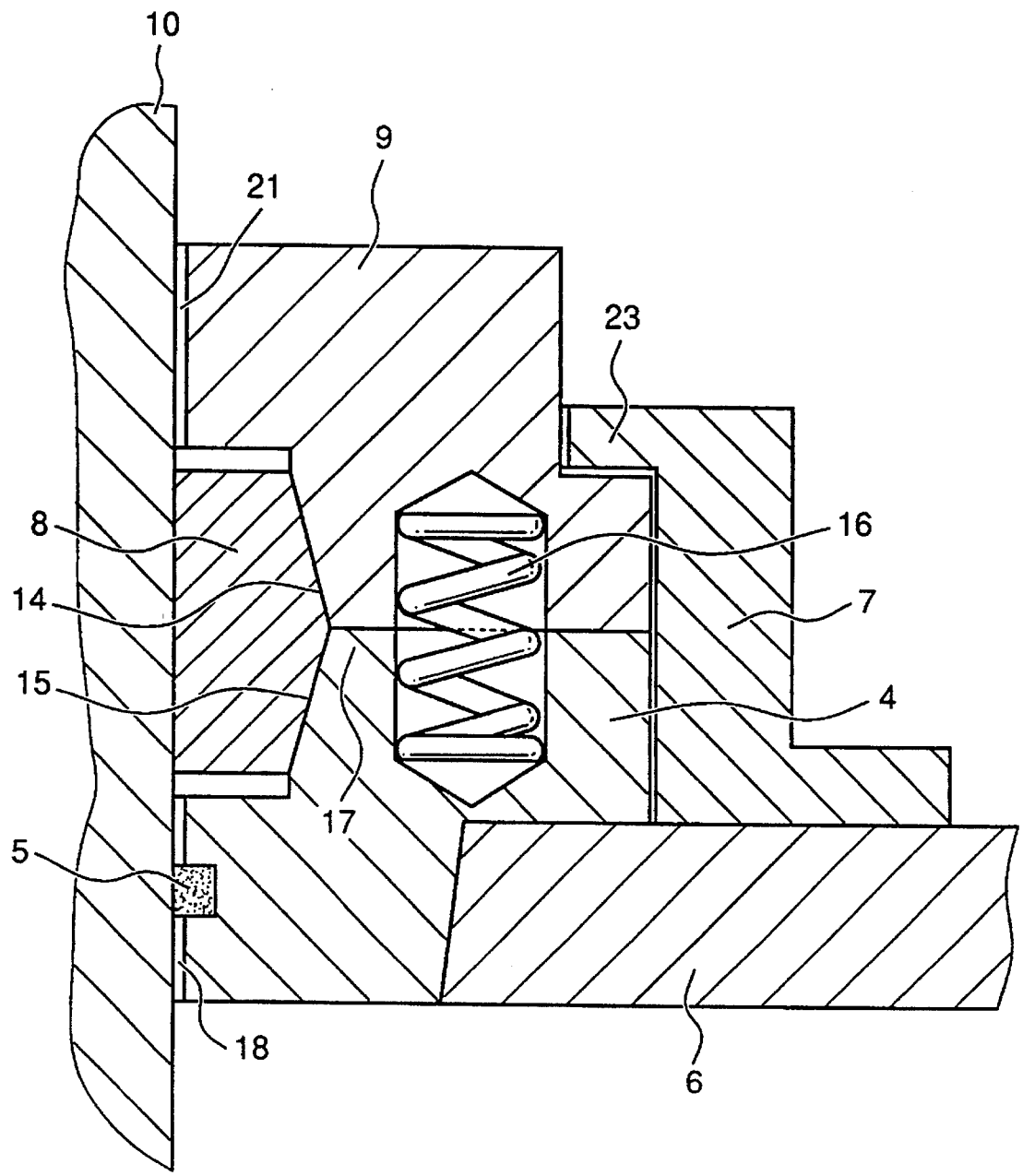
FIG. 2 shows a cross-sectional view of a portion of the clamping arrangement used in the tire mounting apparatus illustrated in FIG. 1.

Looking now additionally at FIG. 2, the clamping arrangement comprises a pressure transmission element shown here in the form of a pressure ring 4 arranged around the axis of rotation A and the guide 10. The pressure ring 4 is non-rotatably connected to the upper rim portion 6 and serves as a carrier for the upper rim portion 6. The above-mentioned guide play or clearance 18 is to be found between the cylindrical inside wall surface of the pressure ring 4 and the cylindrical outside peripheral surface of the guide 10. A peripherally extending sealing element 5 which is disposed in the region of the guide play 18 serves to seal off the arrangement in relation to a tire-inflation pressure which is to be built up in the interior of the pneumatic tire 20, as indicated at 19 in FIG. 1. The sealing element 5 also has a scraper function.

A catch ring 7 is also non-rotatably connected to the upper rim portion 6. As can be seen from FIG. 2, the catch ring 7 has a holding flange 23 which forms a support configuration for a counter-pressure ring 9. In the released or rest condition of the clamping arrangement, the counter-pressure ring 9 and the pressure ring 4 are pressed apart by a spring 16 suitably disposed therebetween, being illustrated in the form of a coil spring. The above-mentioned guide play or clearance 21 is also to be found between the radially inward wall surface of the counter-pressure ring 9 and the outer peripheral surface of the guide 10.

The pressure ring 4 has a conical or taper surface 15 which extends around the axis of rotation A and which faces towards the outer peripheral surface of the guide 10. The counter-pressure ring 9 also has a conical or taper surface 14 which extends around the axis of rotation A and which also faces towards the outer peripheral surface of the guide 10. It will be clearly seen from FIG. 2 that the two taper surfaces 14 and 15 are tapered in opposite directions and thus enclose an angle which is less than 180° and which is here preferably an obtuse angle.

Figure 3A:
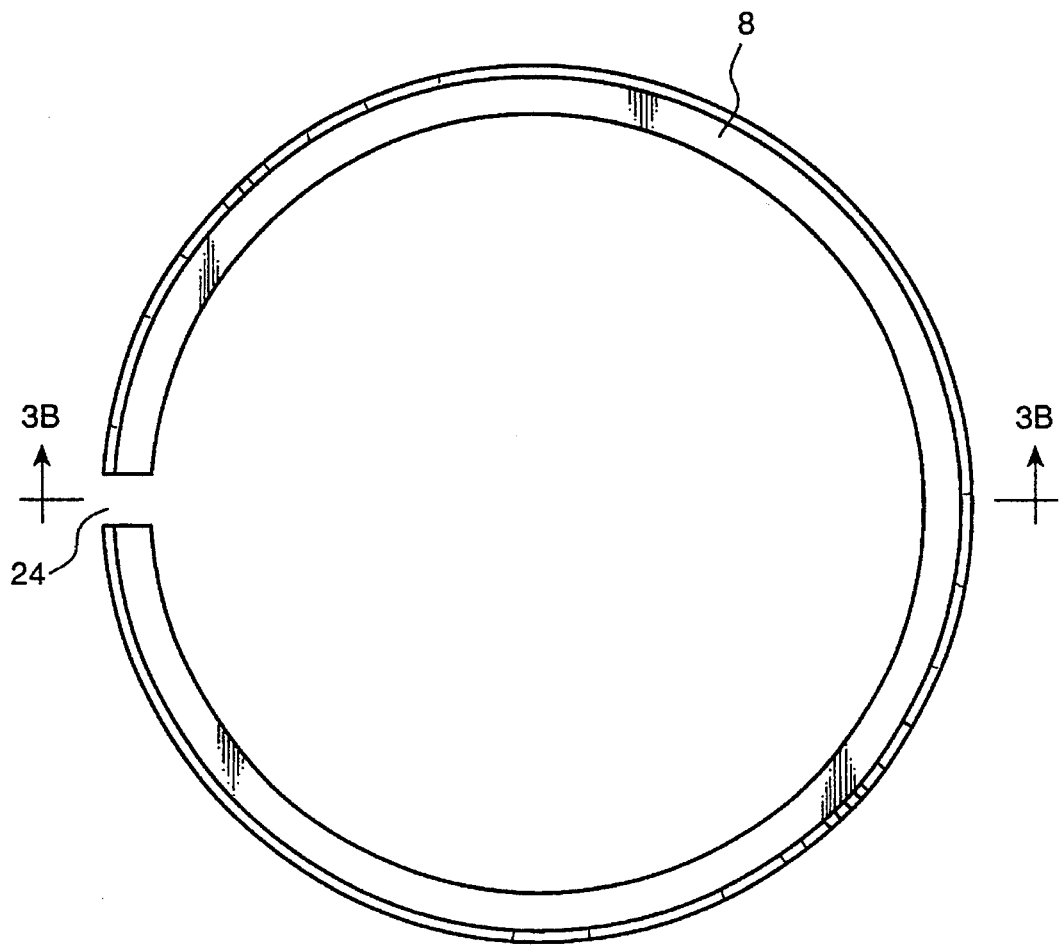
FIGS. 3A and 3B show an embodiment of a clamping element of the apparatus shown in FIG. 1, with FIG. 3A being a top plan view and FIG. 3B being a cross-section taken along line 3B—3B of FIG. 3A.
Figure 3B:
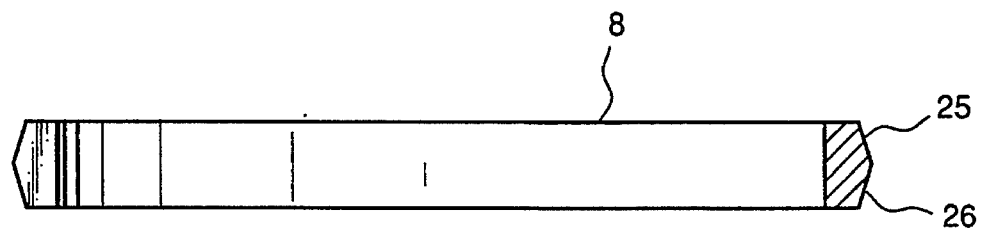

Reference numeral 8 in FIGS. 1 and 2 denotes a clamping element having conical or tapered contact surfaces 25 and 26, shown in FIG. 3B, which are matched to the tapered surfaces 14 and 15 of the counter-pressure ring 9 and the pressure ring 4, respectively. The taper contact surfaces of the clamping element 8 bear against the tapered surfaces 14 and 15. The clamping element 8 is of an annular configuration as can be most clearly seen from FIG. 3A, and thus extends around the guide 10.

It will be seen from FIG. 3A that the clamping element 8 of the ring configuration is deformable by virtue of including a suitably shaped and provided slit 24, the clamping element 8 being more particularly adapted to be elastically deformable. The ring-like clamping element 8 may have a single slit 24, as shown in FIG. 3A, or it may have a plurality of slits at appropriate locations. It is also possible to use a collet-like element, or the like member, to produce the clamping effect which will be described below in connection with the clamping element 8.

The above-described arrangement provides that the upper rim portion 6 can be non-rotatably connected to the guide 10 by utilizing the tire-inflation pressure in the interior 19 of the pneumatic tire 20 which is disposed between the two rim portions 2 and 6, while eliminating or compensating for concentricity run-out and lateral run-out or defects in the mounting of the pneumatic tire in the apparatus, due to guide play or clearance. To achieve that effect, the inflation pressure in the tire interior 19 acts on the pressure ring 4 and urges the pressure ring 4 towards a flat surface, indicated at 17 in FIG. 2, on the counter-pressure ring 9, against the force of the spring 16. When that happens, the flange 23 on the catch ring 7, which is connected to the rim portion 6, carries the forces involved, thus acting as a support portion. That displacement of the pressure ring 4 and/or the counter-pressure ring 9 by virtue of the inflation pressure in the tire interior 19 is transmitted to the clamping element 8 by way of the tapered surfaces 26 and/or 25 where they cooperate with the corresponding taper contact surfaces 15 of the pressure ring 4 and 14 of the counter-pressure ring 9, more specifically in such a way that the clamping element 8 is deformed radially inwardly towards the guide and thus produces a positively locking engagement with the outside peripheral surface of the guide 10. In that way the upper rim portion 6 is non-rotatably connected to the guide 10 in a condition of positively locking engagement and in concentric relationship, for a measuring or testing operation to be carried out on the tire 20.

In that way, the inflation pressure which is produced within the tire by inflation thereof is utilized to cause the pressure ring 4 and the counter-pressure ring 9 to be moved and pressed towards each other, whereby the clamping element 8 is deformed elastically inwardly by way of the internal tapered surfaces 25 and 26.

When the tire-inflation pressure drops or is released from the tire, the pressure ring 4 and the counter-pressure ring 9 are moved away from each other again by the force of the spring 16 so that the clamping element 8 can deform radially outwardly again, by virtue of a spreading action on the part of same, and can thus be restored to its original configuration. In that condition, the rim portion 6 can then be displaced axially along the guide 10 again, by virtue of the guide play or clearance as indicated at 18 and 21, respectively, between the pressure ring 4 and the counter-pressure ring 9. For example, the upper rim portion 6 together with its clamping arrangement can be removed for removal of the tire after the measuring or testing operation thereon.

After a fresh tire has been introduced into the apparatus, the upper rim portion 6 can be moved back into its measuring position for clamping thereof to hold the pneumatic tire 20 in the appropriate location. That operation of removing the upper rim portion 6 with its clamping arrangement and re-fitting same can be effected approximately without involving any force, apart from the actual weight of the components which have to be moved. In addition, since the illustrated apparatus provides for automatic adjustment to adapt to the width of the tire at the beads thereof, by virtue of the action of the spring 16 which thus operates as a return spring, the illustrated apparatus can ensure that the clamping element 8 remains in its spread or disengaged condition and does not jam on the guide 10. That can provide for displacement of the upper rim portion 6 without difficulty, by virtue of the guide play 18 and 21 being of a suitably large dimension, while also ensuring that the rim portion 6 involves the minimum amount of radial and lateral run-out when the clamping arrangement is in a clamping condition.

It will be noted at this point that the clamping arrangement may also have a plurality of springs corresponding to the spring 16 shown in FIG. 2, arranged, for example, at equal angular spacings about the axis of rotation A.

When the apparatus is in the measuring or testing position, the upper rim portion 6 and the associated clamping apparatus are held in position during the measuring or testing run by a counter-pressure sleeve 11 and a closure cover 12. The inflation pressure required in the tire interior 19 can be produced by means of an air inflation unit which passes air under pressure through the measuring spindle 1, the guide 10 and the spacer sleeve 3.

As indicated above, the embodiment of the clamping element 8 shown in FIGS. 3A and 3B is in the form of a spreadable ring having the slit 24 so that it can be resiliently deformed in a radial direction. The slit 24 can be clearly seen from FIG. 3A, which is a plan view of the clamping element 8, while FIG. 3B, which is a view of the clamping element 8 in partial cross-section, shows the taper surfaces 25 and 26 thereof, which cooperate with the taper surfaces 14 and 15 of the counter-pressure ring 9 and the pressure ring 4, respectively.

In the inserted condition, the clamping element 8, in cooperating with the centering taper surfaces 14 and 15, which do not have a self-locking effect, serves to provide for play-free centering of the mounting rim portion 6. Then, when pressure is applied by virtue of the tire-inflation pressure, the maximum degree of accuracy in respect of radial and lateral run-out is produced by virtue of the above-mentioned positively locking engagement. When the inflation pressure is released, the clamping element 8 can be moved virtually without any force being applied thereto, by virtue of the provision of a previously determinable play.

As indicated hereinbefore, the apparatus according to the invention for mounting a pneumatic tire in a measuring and/or testing unit can virtually eliminate any errors due to radial and/or lateral run-out or due to play or clearance between components, for the purposes of carrying out the measuring or testing operation, while at the same time affording generous clearance between the displaceable rim portion 6 or its carrier, and the guide 10, to permit easy displacement of the rim portion 6 on the guide 10 for fitting a tire in position between the first and second mounting rim portions of the apparatus.

It will be appreciated that the above-described apparatus according to the invention has been set forth solely by way of example and illustration of the principles of the invention and that various modifications and alterations may be made therein without thereby department from the spirit and scope of the invention.

What is claimed is:

1. Apparatus for mounting a pneumatic tire to a rotatable spindle having an axis of rotation including: first and second mounting rim portions adapted to hold therebetween a pneumatic tire in an inflated condition; a guide member connected between said first and second mounting rim portions and said spindle in concentric relationship with respect to the axis of rotation; a clamp assembly operatively connected to said first mounting rim portion and positioned between said first mounting rim portion and said guide member and having a first released and a second non-rotational clamped condition said first mounting rim portion being axially displaceable along said guide member when said clamp assembly is in said first released condition; said clamp assembly including a seal member disposed against said guide member and a deformable clamping element disposed adjacent said guide member and being deformable upon inflation of the tire so that when deformed said clamp assembly is in said second non-rotational clamp condition and said first mounting rim portion and said guide member are locked together.

2. Apparatus as set forth in claim 1 wherein the clamping element is elastically deformable.

3. Apparatus as set forth in claim 1 further including at least one pressure transmission element to transmit tire-inflation pressure to said deformable clamping element.

4. Apparatus as set forth in claim 3 wherein said at least one pressure transmission element is movable relative to said guide member which movement deforms said deformable clamping element.

5. Apparatus as set forth in claim 3 wherein said at least one pressure transmission element is in the form of a pressure ring.

6. Apparatus as set forth in claim 5 wherein said pressure ring constitutes a carrier for said first mounting rim portion and is mounted with respect to said guide member so that clearance space is provided therebetween.

7. Apparatus as set forth in claim 7 wherein said seal member provides sealing across the clearance space provided between said pressure ring and said guide member.

8. Apparatus as set forth in claim 3 wherein said deformable clamping element and said at least one pressure transmission element have corresponding tapered surfaces which bear against each other so that movement of said at least one pressure transmission element, caused by the tire-inflation pressure, is transmitted to and deforms said deformable clamping element.

9. Apparatus as set forth in claim 3 wherein said at least one pressure transmission element is in the form of a pressure ring and constitutes a carrier carrying the first mounting rim portion.

10. Apparatus as set forth in claim 3 wherein said at least one pressure transmission element is in the form of a pressure ring, and further including a counter-pressure ring disposed adjacent said at least one pressure ring, said at least one pressure ring being axially movable relative to said counter-pressure ring.

11. Apparatus as set forth in claim 10 further including a spring disposed between said pressure ring and the counter-pressure ring, said spring providing a spring force in opposition to tire-inflation pressure.

12. Apparatus as set forth in claim 8 wherein said counter-pressure ring is mounted with respect to said guide member so that a clearance space is provided therebetween, 13. Apparatus as set forth in claim 8 wherein said clamping element is in the form of a ring adapted to be spreadable in a radial direction.

14. Apparatus as set forth in claim 13 wherein said clamping element comprises a ring which is slit in at least one location.

15. Apparatus as set forth in claim 8 wherein said counter-pressure ring has a tapered surface adapted to bear against said clamping element and wherein the tapered surfaces of said counter-pressure ring and said at least one pressure transmission element together define an angle less than 180°.

16. Apparatus for mounting a pneumatic tire on a device having a rotatable spindle with a rotational axis comprising first and second rim mounting portions, at least said first rim mounting portion being movable along said rotatable spindle in a direction substantially parallel with the rotational axis, at least one deformable clamp assembly positioned between said first rim mounting portion and said rotatable spindle so that when a tire is mounted between said first and second rim mounting portions and inflated, the inflation pressure activates said at least one deformed clamp assembly to non-rotatably clamp said first rim mounting portion and said rotatable spindle together.

* * * * *